Feb. 13, 1962   I. SÖYLAND ET AL   3,021,023
ARRANGEMENT IN MOBILE EXCAVATORS
Filed Aug. 2, 1960
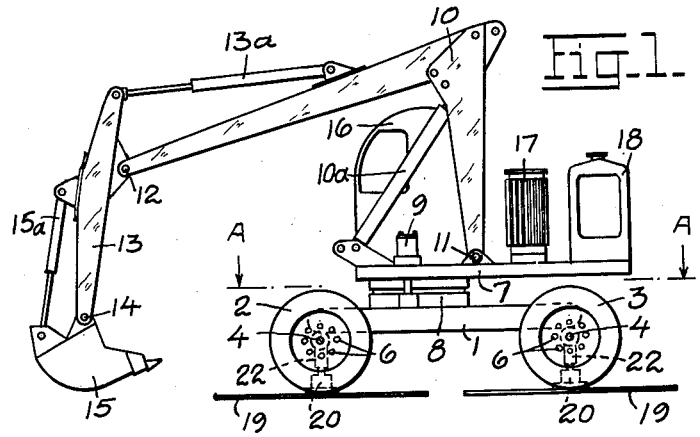
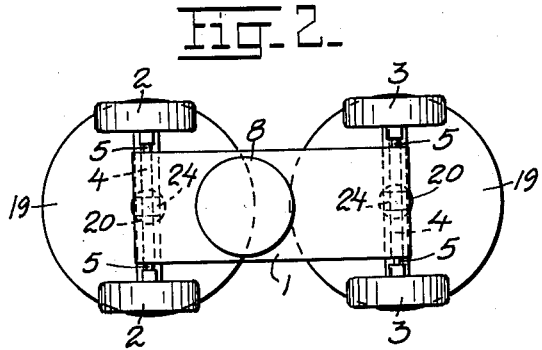
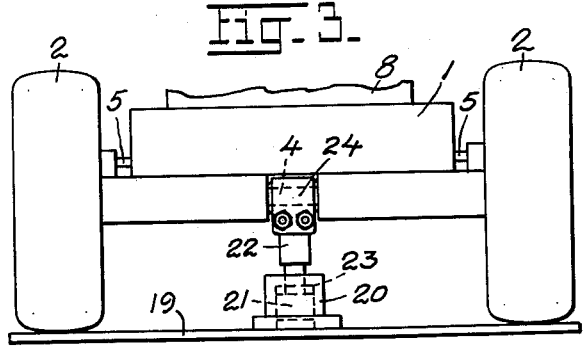

United States Patent Office 3,021,023
Patented Feb. 13, 1962

3,021,023
ARRANGEMENT IN MOBILE EXCAVATORS
Ingebret Söyland and Kristian Söyland, Bryne,
near Stavanger, Norway
Filed Aug. 2, 1960, Ser. No. 47,039
Claims priority, application Norway Aug. 19, 1959
3 Claims. (Cl. 214—138)

This invention relates to mobile excavators and is concerned especially with mobile excavators of the type disclosed in our copending application, Serial No. 779,219, dated December 9, 1958, now Patent No. 2,995,261, and comprising a chassis frame, pairs of freely rotatable front and rear wheels, a rotatably driven shovel supporting platform pivotally mounted for rotation on said frame about a vertical axis, wheel-locking means operable at will to releasably lock at least one pair of wheels to preclude rotation thereof, an angle-shaped digging or jib arm having one end pivotally mounted on the platform and movable in a vertical plane, a shovel arm having opposite ends and pivotally connected intermediate its opposite ends to the other free end of said jib arm, a shovel bucket pivotally connected to one end of the shovel arm, a double acting mechanism connected to the shovel arm and to the jib arm for actuating the bucket, and a second double acting mechanism pivotally connected to the platform and intermediate opposite ends of the jib arm for raising and lowering said jib arm.

Excavators of the type above referred to are moved during digging operation in the manner, that the digging arm with the shovel bucket is pressed down on the ground whereby the adjacent pair of wheels is lifted clear of the ground so that the machine only rests on the wheels of the other pair, and when the digging arm in this position is swung by turning of the platform the lifted end of the machine frame is turned sideways whereupon the lifted pair of wheels is lowered.

Thereafter the digging arm is turned to the opposite end of the machine frame which thereafter is lifted and turned to the same side as the first mentioned end whereby the machine is moved sideways as clearly will be understood. By this construction it is made possible to move the machine on the site even if the wheels are sunk deeply into a soft ground.

The present invention relates to an arrangement in excavators of the type above mentioned, by which the ability thereof to be moved in an easy and rapid manner on soft ground is further improved, and the invention is distinguished thereby that below each of the pairs of wheels is placed a conveniently circular carrying disc having a diameter which at least is equal to the distance between the outer sides of the wheels of the pair in question, said carrying disc having a central, rotatably mounted column the upper end of which is pivotally secured midway between the wheels of the pair in question about an axis coinciding with the axis of said wheels.

By the device according to the invention, while retaining the ability of the machine to be moved sideways step by step, a large carrying surface is obtained, whereby the pressure per surface unit against the ground becomes so small that the machine floats even on boggy and swampy ground.

An embodiment of the invention is illustrated as an example, in the accompanying drawing in which:

FIG. 1 is a side elevation view of a mobile excavator according to the invention, FIG. 2 is a sectional top plane view along the line A—A in FIG. 1, and FIG. 3 is a front end view of the chassis in FIG. 2 in a somewhat greater scale.

In the drawing 1 indicates a chassis frame movable on two pairs of wheels, front wheels 2 and rear wheels 3, respectively, and each and all of the wheels 2 and 3 are freely mounted on the respective axles 4.

In order to prevent moving of the excavator chassis during digging operation one or both pairs of said wheels are lockable relative the frame 1 by means of locking pins 5 co-operating with annularly spaced apertures 6 disposed concentric with the axis of rotation of the respective wheel and radially thereof. Means is provided operable at will to reciprocably drive the pins 5 into and out of engagement with a respective wheel.

A platform 7 is supported turnable on the chassis frame 1 by means of a bearing 8 and the rotation of said platform 7 is effected by means of a reversible hydraulic motor 9.

A rigid angle-shaped digging or jib arm 10 is pivoted at one end at 11 to the platform 7 so that the arm may swing in a vertical plane and the other end of the arm 10 is pivotally connected at 12 to a shovel arm 13 carrying pivotally at 14 a shovel 15.

Operation of the arms 10, 13 and of the shovel 15 take place by means of double acting hydraulic pressure cylinders 10a, 13a and 15a respectively, controlled by usual control means from the driver's cab 16. The hydraulic fluid is supplied to the respective hydraulic motors from a fluid tank 17 by means of an engine and pump aggregate 18 both supported on the platform 7.

According to the invention a circular carrying plane or disc 19 is placed below each of the pairs of wheels 2 and 3 respectively said discs 19 having a diameter which at least is as large as the distance between between the outer sides of the wheels of the respective pairs, as shown.

Each of the carrying discs 19 is provided with a centrally positioned bearing 20 in which a cylindrical head-shaped lower end 21 of a column like support member 22 is supported rotatably about a vertical axis. The bore 23 of the bearing 20 has somewhat greater length than that of the head 21 allowing a limited axial movement thereof in said bore 23.

The upper end of the support member 22 is pivotally secured on the wheel axle 4 midway between the wheels by means of a bearing 24.

The length of the support member 22 is adjustable so that the limited axial movement of the head 21 thereof in the bearing 20, causes the weight of the excavator during operation to be carried by the carrying discs through the wheels only. When the respective pairs of wheels are successively raised a greater distance than the limited axial movement of the head 21 in the bearing 20 and shifted as described hereinbefore the support members 22 lift the carrying discs clear of the ground to be shifted with their associated pairs of wheels. Thus the action of the support members is limited to raising the discs.

By supporting the pairs of wheels on the above described carrying discs 19 the pressure of the machine against the ground becomes so small per surface unit that the machine is supported on soft grounds that normally could not support an excavator.

During movement of the machine in the manner previously described the carrying planes are lifted together with the adjacent end of the chassis frame 1 and will during this movement, due to the support member 22 being secured pivotally on the wheel shaft 4, always occupy horizontal position. When the digging arm 10 in this lifted position of the chassis is swung by rotation of the platform to swing the lifted frame end to the side, the other pair of wheels, resting on its carrying disc, rolls thereon with corresponding rotation of the support member 22 in the bearing 20. In this manner the movement may take place very easy and with low power consumption compared to that if the wheels were sunk more or less into the ground.

During transport of the excavator from one site to another the carrying discs are released from the wheel shafts, said discs being preferably secured thereto by demountable bearings 24, whereafter the machine may be towed in usual manner with a lorry or the like.

We claim:

1. A mechanical shovel comprising, in combination, a chassis frame, pairs of freely rotatable front and rear wheels, a rotatably driven shovel supporting platform pivotally mounted for rotation on said frame about a vertical axis, wheel-locking means operable at will to releaseably lock at least one pair of wheels to preclude rotation of at least said one pair of wheels, an angle-shaped jib arm having one end pivotally mounted on the platform and movable in a vertical plane, a shovel arm having opposite ends and pivotally connected intermediate its opposite ends to the other free end of said jib arm, a shovel bucket pivotally connected to one end of the shovel arm, a double acting mechanism connected to the shovel arm and to the jib arm for actuating the bucket, a second double acting mechanism pivotally connected to the platform and intermediate opposite ends of the jib arm for raising and lowering said jib arm, a circular carrying disc placed below each of the pairs of wheels, said disc having a diameter at least equal to the distance between the outer sides of the wheels of the pair in question, support means connecting each of said discs to the adjacent end of the chassis frame, said means being pivotally secured to the frame about an axis coinciding with the axis of rotation of the wheels and to the plane centrally thereof, for rotation about a vertical axis.

2. A mechanical shovel as in claim 1, in which each carrying disc is provided with a centrally thereon positioned bearing, said support means including a support member having its lower end supported in said bearing for rotation about a vertical axis and its upper end provided with a bearing releasably mounted on the adjacent wheel shaft.

3. A mechanical shovel as in claim 2 in which the lower end of the support member is supported for limited axial movement in said bearing.

References Cited in the file of this patent

UNITED STATES PATENTS

| | | |
|---|---|---|
| 1,653,247 | Zollinger | Dec. 20, 1927 |

FOREIGN PATENTS

| | | |
|---|---|---|
| 539,100 | Belgium | July 15, 1955 |
| 1,050,078 | France | Aug. 26, 1953 |